United States Patent
Cezario

(10) Patent No.: US 10,199,899 B2
(45) Date of Patent: Feb. 5, 2019

(54) INTERNAL PRESSURE ATTENUATOR DEVICE FOR ROTATING ELECTRICAL MACHINES ABLE TO OPERATE IN EXPLOSIVE ATMOSPHERES

(71) Applicant: WEG EQUIPAMENTOS ELÉTRICOS S.A., Jaraguá do Sul (BR)

(72) Inventor: Cassiano Antunes Cezario, Jaraguá do Sul (BR)

(73) Assignee: WEG EQUIPMENTOS ELÉTRICOS S.A., Jaraguá do Sul, SC (BR)

( * ) Notice: Subject to any disclaimer, the term of this patent is extended or adjusted under 35 U.S.C. 154(b) by 504 days.

(21) Appl. No.: 14/866,134

(22) Filed: Sep. 25, 2015

(65) Prior Publication Data
US 2016/0149462 A1    May 26, 2016

Related U.S. Application Data

(60) Provisional application No. 62/055,755, filed on Sep. 26, 2014.

(51) Int. Cl.
*H02K 5/00*     (2006.01)
*H02K 5/136*    (2006.01)

(52) U.S. Cl.
CPC .................... *H02K 5/136* (2013.01)

(58) Field of Classification Search
CPC ................... H02K 9/24; H02K 5/136
USPC ........................................ 310/87–89
See application file for complete search history.

(56) References Cited

U.S. PATENT DOCUMENTS

| | | | |
|---|---|---|---|
| 2,152,586 A * | 3/1939 | Freeman | H02K 9/24 310/88 |
| 2,594,003 A * | 4/1952 | Else | H02K 9/24 310/56 |
| 2011/0203235 A1 | 8/2011 | Witter et al. | |
| 2013/0284464 A1 | 10/2013 | Koban et al. | |
| 2014/0223689 A1 | 8/2014 | Witter et al. | |

FOREIGN PATENT DOCUMENTS

| | | |
|---|---|---|
| JP | 06121482 A * | 4/1994 |
| JP | H06 121482 | 4/1994 |

OTHER PUBLICATIONS

European Search Report dated Feb. 15, 2016 in European Patent Application EP15 18 6767.

* cited by examiner

*Primary Examiner* — Thanh Lam
(74) *Attorney, Agent, or Firm* — B. Aaron Schulman, Esq.; Stites & Harbison, PLLC

(57) ABSTRACT

Disclosed herein are pressure attenuator devices for rotating electrical machines, The pressure attenuation device contains a screen with a plurality of openings, wherein the screen is positioned within the internal cavity and configured to segregate a flame front propagating from an ignition source formed by a combustion process originated in the cavity. Thus, with the use of the pressure attenuation device, an expressive reduction of pressure inside the cavity of the rotating electrical machine is obtained.

18 Claims, 15 Drawing Sheets

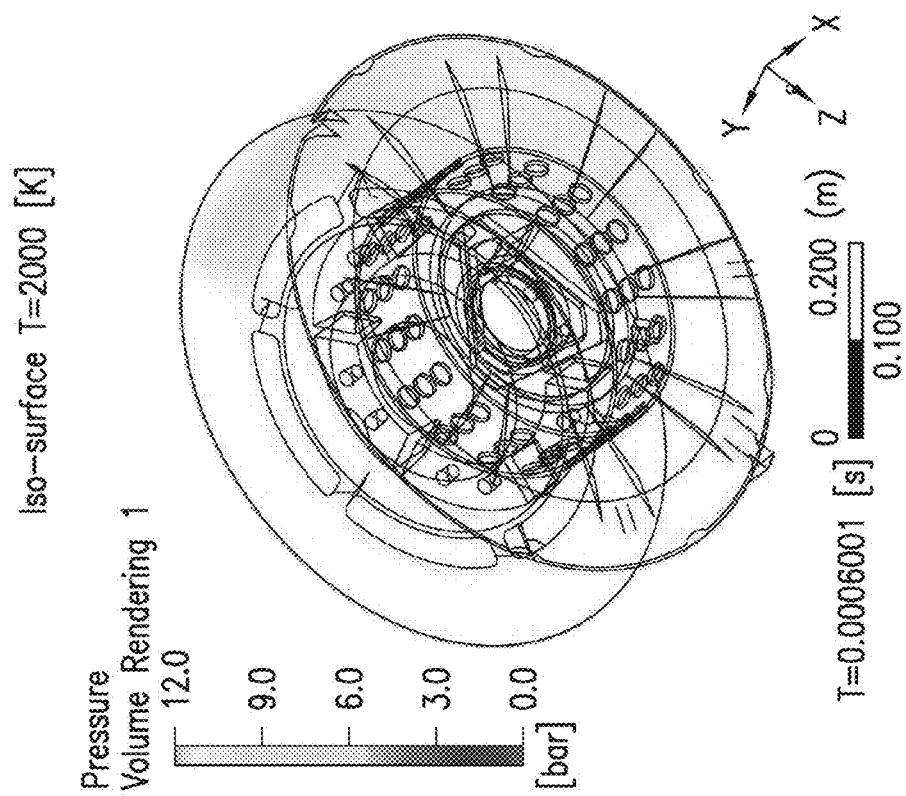
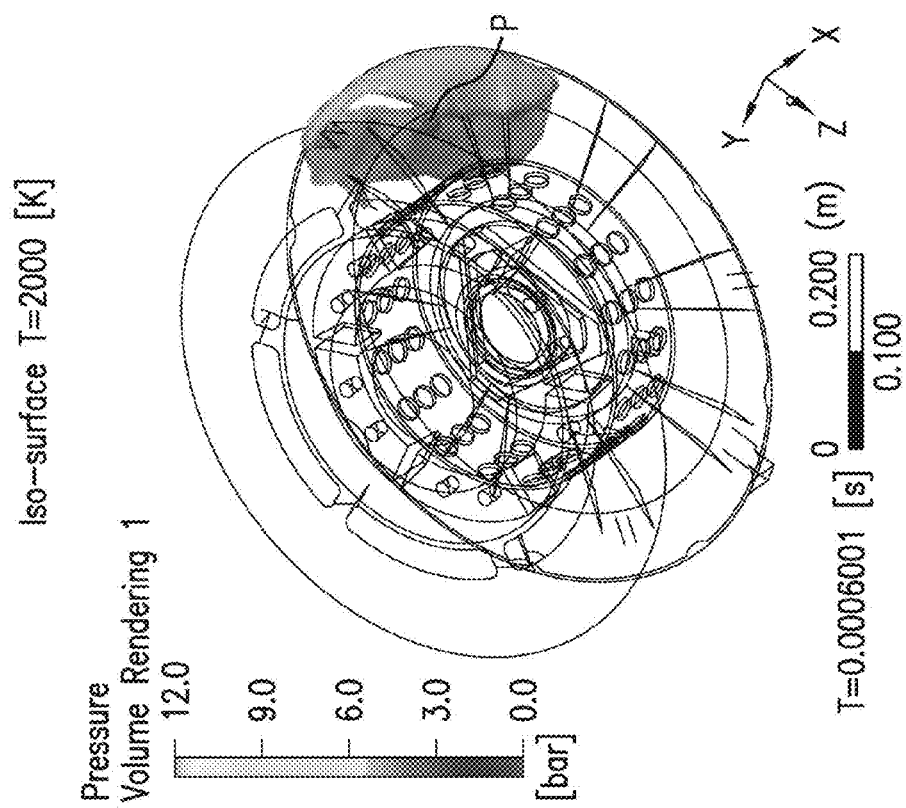
FIG. 4A
FIG. 4B

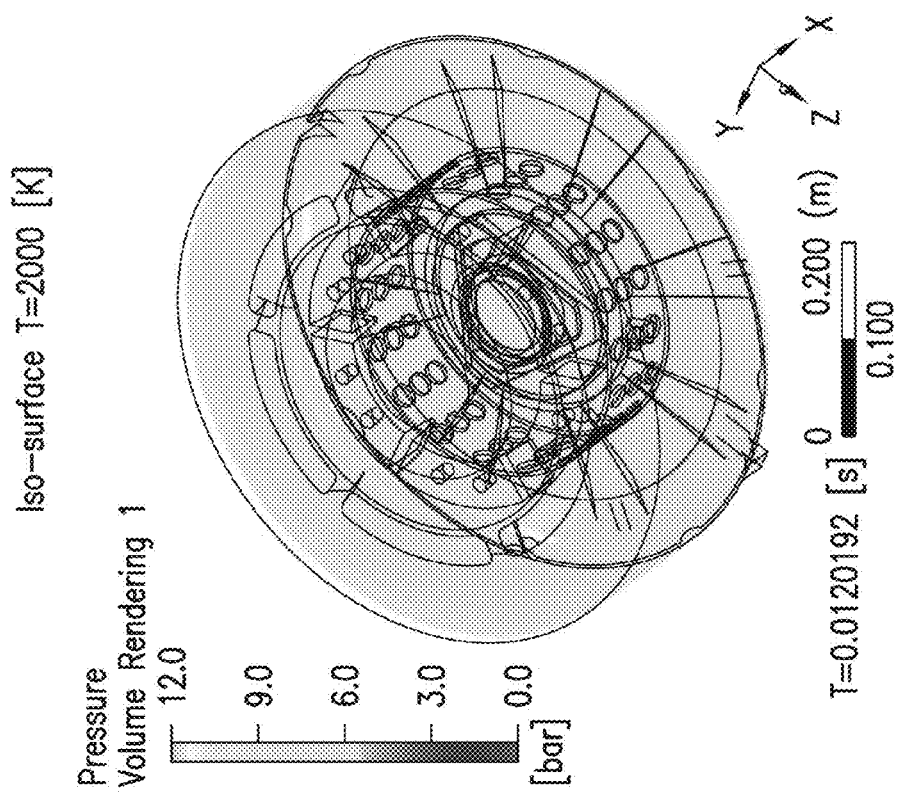
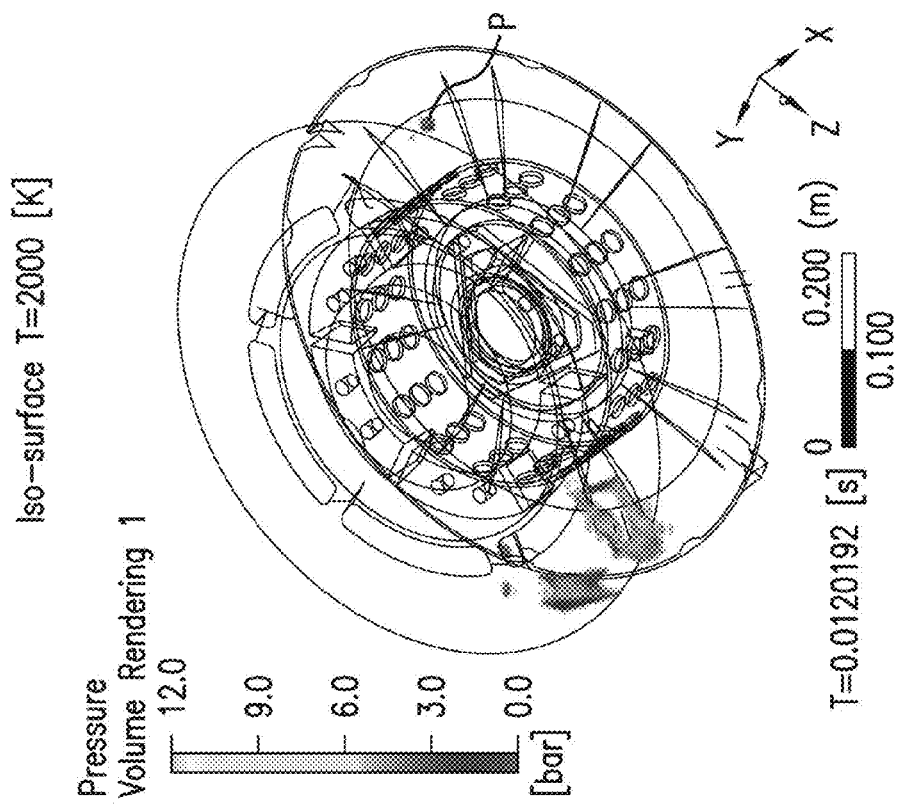
FIG. 4K
FIG. 4L

INTERNAL PRESSURE ATTENUATOR DEVICE FOR ROTATING ELECTRICAL MACHINES ABLE TO OPERATE IN EXPLOSIVE ATMOSPHERES

RELATED APPLICATIONS

This application claims the benefit of and the priority to U.S. Provisional Application No. 62/055,755, filed Sep. 26, 2014.

FIELD OF INVENTION

This invention relates to an internal pressure attenuator device for rotating electrical machines able to operate in explosive atmospheres and, more specifically, to an apparatus that allows for reducing the internal pressure in the machine casing, enabling significant reductions of the pressure level inside the machine and preventing an eventual combustion process.

BACKGROUND

Rotating electrical machines are widely known in the art, and basically include a static part (stator) and a rotating part (rotor). In a simplified version, the stator is made up of a slotted magnetic core where coils or windings are placed, and the rotor consists of a slotted magnetic core that can be filled with coils or windings, or filled with liquid metal and then so sealed. This assembly is mounted on an axle, thus producing the rotor.

Explosive atmospheres are those that contain, in addition to oxygen, a proportion of gas, steam, dust or fibers, where a spark from an electrical circuit or the heating of a device can be an ignition source or cause an explosion. This kind of atmosphere is found, for example, in petrochemical, food, pharmaceutical, paper, and textile industries.

A "combustion process" depends upon the rate of flame propagation and to the generated pressures. Usually, combustion processes with flame propagation speeds of up to 2 m/s and pressures below 4 bar are referred to as "burning". For speeds between 0.5 and 4.0 m/s at pressures ranging between 4.0 and 10.0 bar the term "explosion" is used. The term "blasting" is adopted when the pressure exceeds 10.0 bar and speeds exceed 30 m/s and even exceed the supersonic speed. As used herein, the term "explosion" encompasses any type of combustion process.

The electrical machines designed to operate in this kind of atmosphere are built to avoid or reduce the risk of explosion. One known way to achieve this is to confine the parts that can cause the ignition of an explosive atmosphere within a casing capable of withstanding the pressure generated by an internal explosion without allowing it to spread to the external environment. The machine casing is capable of withstanding the pressure wave generated by the explosion inside. Usually, the thickness of the casing is increased to make it able to withstand the mechanical stresses from this explosion process. Thus, the intention is to limit the effect— in this case, the pressure generated by the combustion process, and not the cause—the increase in pressure.

Increasing the thickness of the casing causes an increase in weight and volume of the rotating electrical machine, and consequently, operational restrictions and costs increase. In some cases, performing prior tests is required to ensure that the components of the casing are able to withstand the occurrence of explosion. These tests, which can be performed on the electrical machine components and/or on the electrical machine after assembled, result in a higher manufacturing costs and higher manufacturing times, thus directly impacting the competitiveness of the product.

European document EP 0113628 discloses an electrical rotary machine with an explosion-proof casing formed with shields. The shields include a surface substantially perpendicular to the axis of the rotor, and an outer cylindrical surface, and an inner cylindrical surface, each of these cylindrical surfaces being parallel to the axis of the rotor. The explosion-proof casing is constituted by the casing and fixed shields, the cylindrical surfaces being at the same side of their plane surface and the outer cylindrical surface being situated in the immediate vicinity of the casing.

These shields may perhaps be a more economical solution than the one involving a casing with a greater thickness, but use of the reinforcement shields still causes a significant increase of the whole weight of the machine.

BRIEF SUMMARY

The systems and methods disclosed herein may address the above-mentioned shortcomings in the art, and provide a variety of other benefits. The invention disclosed herein provides for a new rotating electrical machine that allows the attenuation of the internal pressure in the machine casing. This new machine is thus able to operate in explosive atmospheres and provides great economies in the weight and costs of the electrical machines.

Embodiments of the invention provide an internal pressure attenuation solution that does not require increasing the thickness and mass of the rotating electrical machine casing. Embodiments of the invention provide an internal pressure attenuation solution that can be used in several different types of rotating electrical machines. Embodiments of the invention provide an internal pressure attenuation solution that is able to avoid flame propagation to the exterior of the casing.

Embodiments of the invention include a pressure attenuator device for a rotating electrical machine of the type having a casing that defines a cavity along with the rotor stator assembly. The pressure attenuator device is positioned within the cavity and comprises a screen with a plurality of openings, which segregate a flame front propagating from an ignition source formed by a combustion process originating in the cavity. The segregation of the frame front prevents compression of the gases ahead of the flame front, which have not yet burnt. This displacement of the gases before they are burnt affects the pressure within the cavity. An expressive reduction of pressure inside the cavity of the rotating electrical machine is thus obtained.

The term "openings" refers to any material discontinuity, such as slots, holes, orifices, or hollow spaces in the device, having any geometry or dimensions, provided that they allow the segregation of the flame front.

In certain embodiments, the pressure attenuator device is a screen. In certain embodiments, the screen includes a circular ring defined by a cylindrical wall, with the plurality of openings being disposed on the ring wall. In certain embodiments, the openings have a circular geometry.

In certain embodiments, the screen is a polyhedron-shaped structure defined by a plurality of wall sides, with the plurality of openings being disposed on the wall sides.

In certain embodiments, the screen is a disk defined by a flat wall and an inclined wall which projects from the flat wall, with the plurality of openings being disposed on the inclined wall. In certain embodiments, the openings have a circular geometry.

In certain embodiments, the screen is positioned concentrically and co-radially to the center of the stator coils of the rotor-stator assembly. However, in an alternative embodiment, the screen is positioned under or over the stator coil head of the rotor-stator assembly in the radial direction.

Certain embodiments include a rotating electrical machine of the type that has a casing with a cover defining a cavity and a rotor-stator assembly inside the casing. The electrical machine includes a pressure attenuator device inside the cavity, such as a screen with a plurality of openings. These openings segregate a flame front from an ignition source formed by the combustion process originated in the cavity.

In certain embodiments, the screen may be a circular ring defined by a cylindrical wall, with the plurality of openings being disposed on the ring wall. In certain embodiments, the pressure attenuating device can be a disk defined by a flat wall and a inclined wall which projects from the flat wall, with the plurality of openings being disposed on the inclined wall. In certain embodiments, the pressure attenuating device can be a screen defined by a polyhedron-shaped structure with a plurality of wall sides, with the plurality of openings being disposed on the wall sides.

In an embodiment, the pressure attenuator device is attached to one of the covers of the rotating electrical machine. In certain embodiments, the pressure attenuating device can be attached to any location inside the cavity, for example, the coil or the axle of the electrical rotating machine.

In certain embodiments, the pressure attenuating device is positioned concentrically and co-radially to the center of the stator coils of the rotor-stator assembly. In certain embodiments, the pressure attenuating device is positioned under or over the stator coil head of the rotor-stator assembly in the radial direction.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

Figures 1A, 1B:
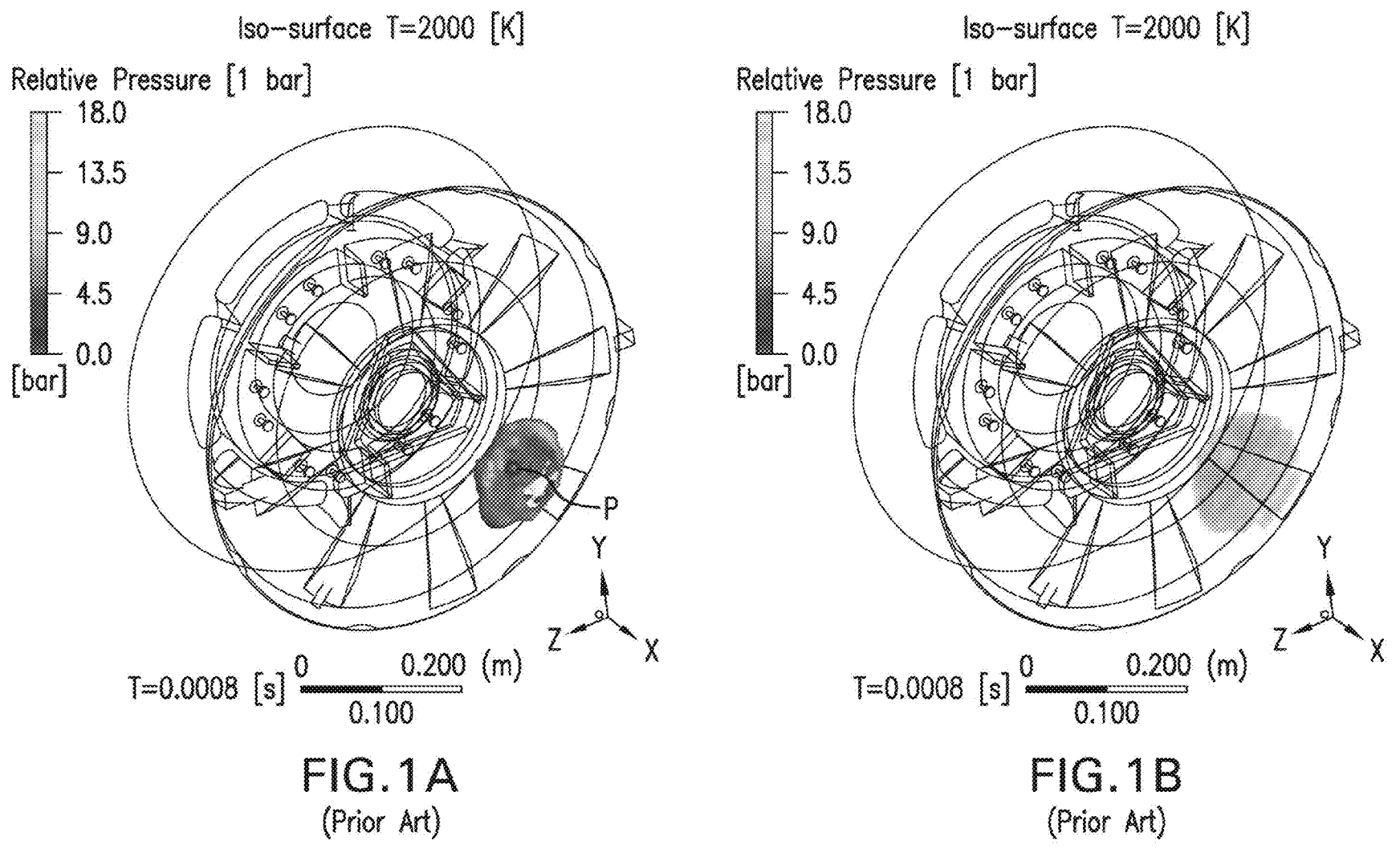

FIGS. 1A-1H are graphical representations showing, over time, the flame front and the pressure inside the cavity of a rotating electrical machine, in accordance with the prior art.

FIGS. 4A to 4L are graphical representations showing, over time, the flame front and the pressure inside the cavity of an exemplary embodiment of a rotating electrical machine with a pressure attenuator device, as described herein.

DETAILED DESCRIPTION

Reference will now be made in detail to certain embodiments, examples of which are illustrated in the accompanying drawings. The embodiments described herein are intended to be exemplary. One skilled in the art recognizes that numerous alternative components and embodiments may be substituted for the particular examples described herein and still fall within the scope of the invention.

FIGS. 1A-1H, are graphical representations showing, over time, the flame front and the pressure inside the cavity of a rotating electrical machine in accordance with the prior art. The point P corresponds to the ignition point. FIGS. 1A, 1C, 1E, and 1G show the flame front at a temperature of 2000 K. FIGS. 1B, 1D, 1F, and 1H show the pressure, in bars, within the cavity.

The figures show the cavity inside the cover and part of the rotating electrical machine casing (e.g. an electric motor).

As can be seen in FIGS. 1A-1H, in the process of combustion in a cavity, the flame front tends to propagate spherically from the ignition point (point P in the figures) The propagation process of the flame front tends to compress the gas mixture, which has not been consumed, resulting in a peak pressure when this mass of compressed gas passes through the combustion process, as there is a concentration of the potential energy.

To avoid accidents, in rotating electrical machines known from the prior art, the casing must be dimensioned to withstand the pressure peak.

Embodiments of the present invention propose a new solution that allows the segmentation of the propagation of the flame front on several different fronts, avoiding the localized concentration of the gases that have not been consumed. This is achieved by a pressure attenuator device disposed within the cavity of the rotating electrical machine, the device comprising a screen with openings that enable the segregation of the flame front.

Figure 1D:
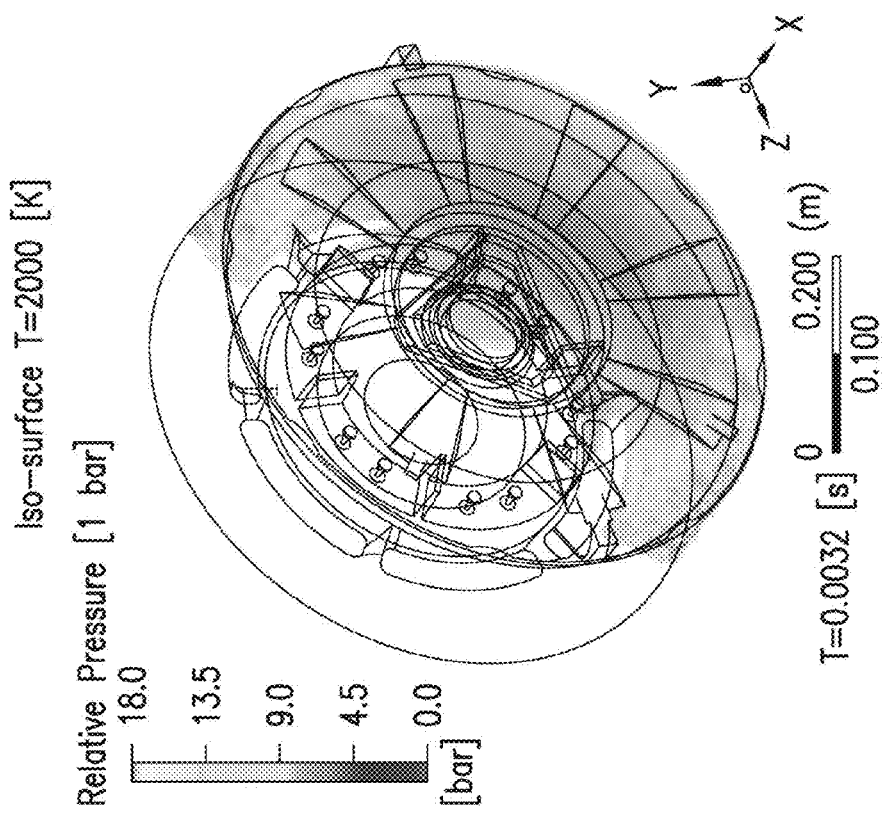
Figure 1C:
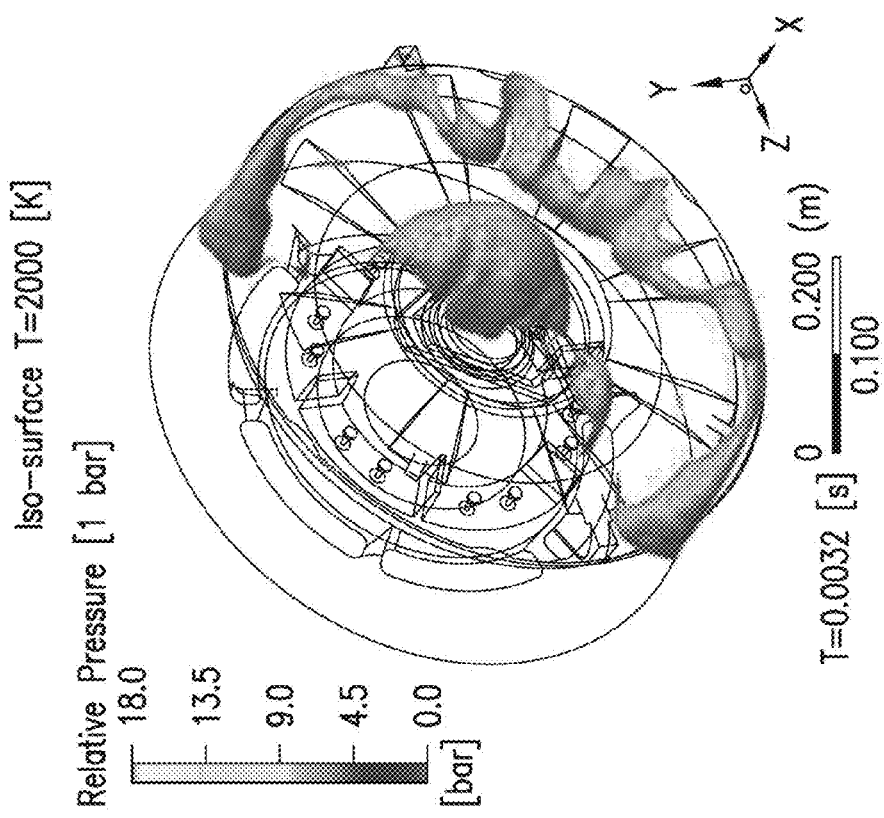
Figure 1F:
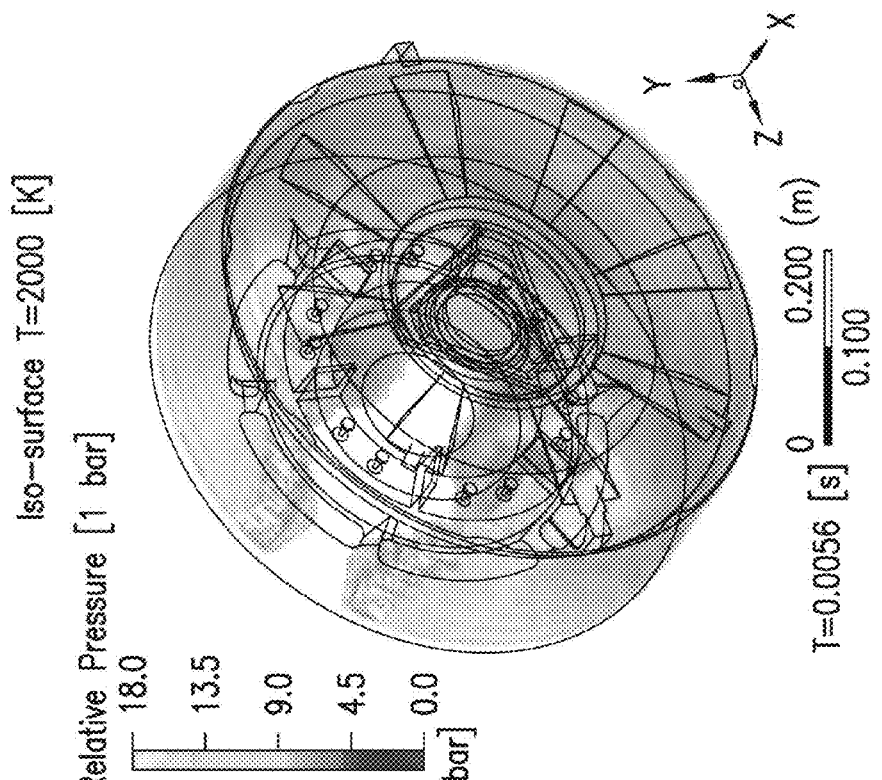
Figure 1E:
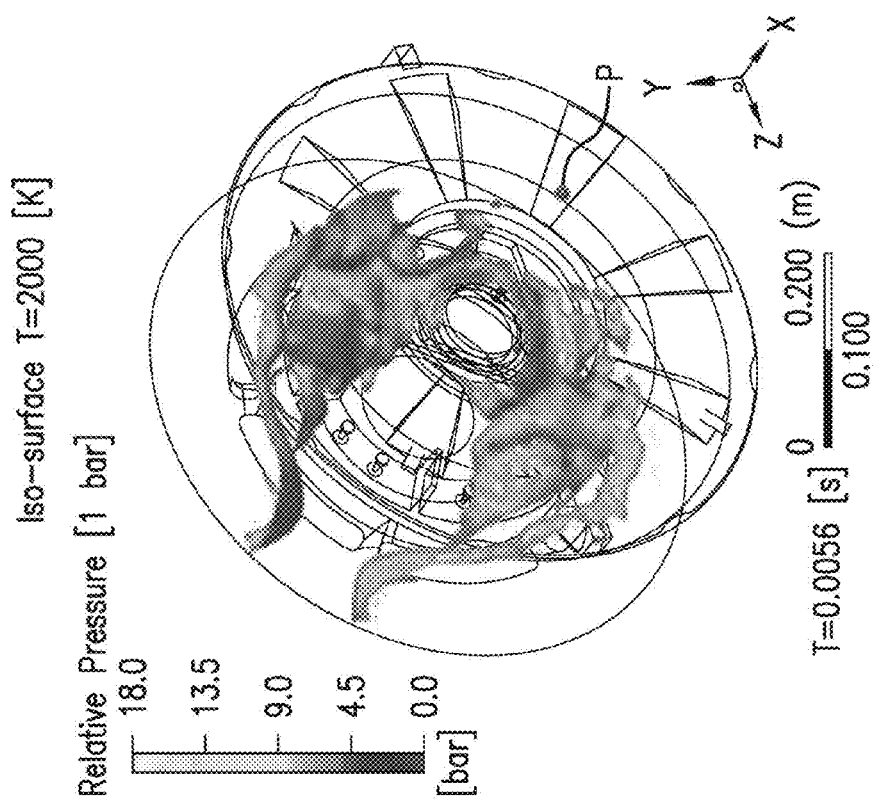
Figure 1H:
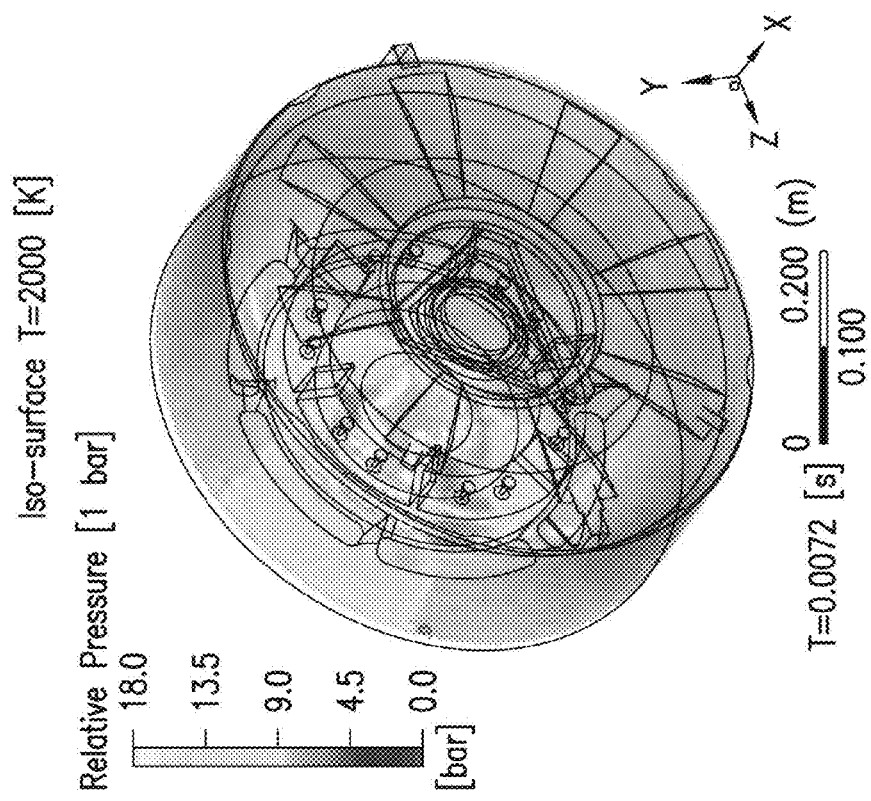
Figure 1G:
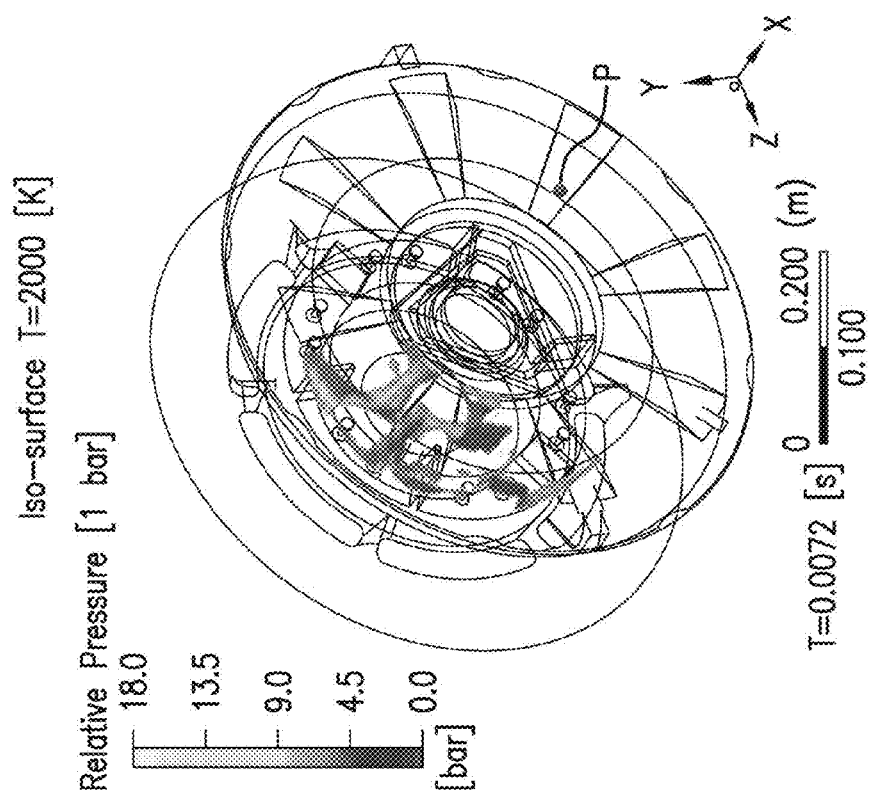
Figure 2:
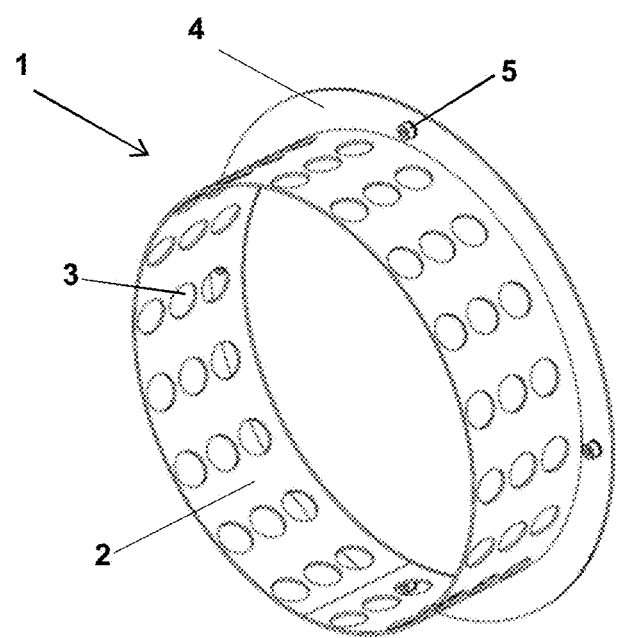
FIG. 2 is a perspective view of the pressure attenuator device according to an exemplary embodiment of a pressure attenuating device, as described herein.

FIG. 2 shows an exemplary embodiment of the pressure attenuator device. In this embodiment, the device 1 comprises a circular ring 2 defined by a cylindrical wall having a plurality of openings 3 disposed on the ring wall.

The surface of the cylindrical wall may be smooth, as shown in the figures, or uneven, such, as for example, a corrugated or notched wall.

The ring 2 is attached to the cover at the extremity of the rotating electrical machine. As known to those skilled in the art, the cover is the end portion of the machine casing, that is, the cover that closes the cylindrical housing of the machine.

Thus, the device 1 may also include a substantially perpendicular edge 4 which helps to secure the attachment of the ring 2 (e.g. by means of screws 5).

Figure 3:
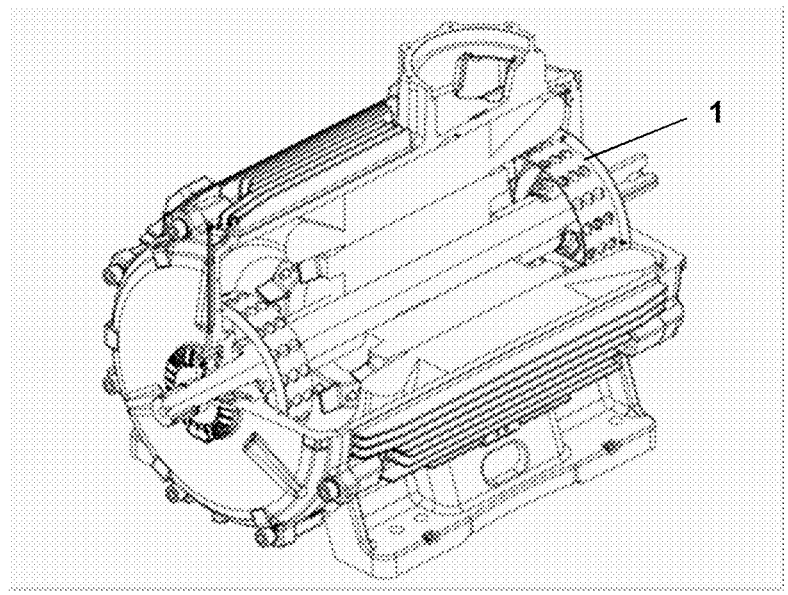
FIG. 3 is a sectioned view of an exemplary embodiment of a rotating electrical machine having a pressure attenuator device, as described herein.
Figure 4D:
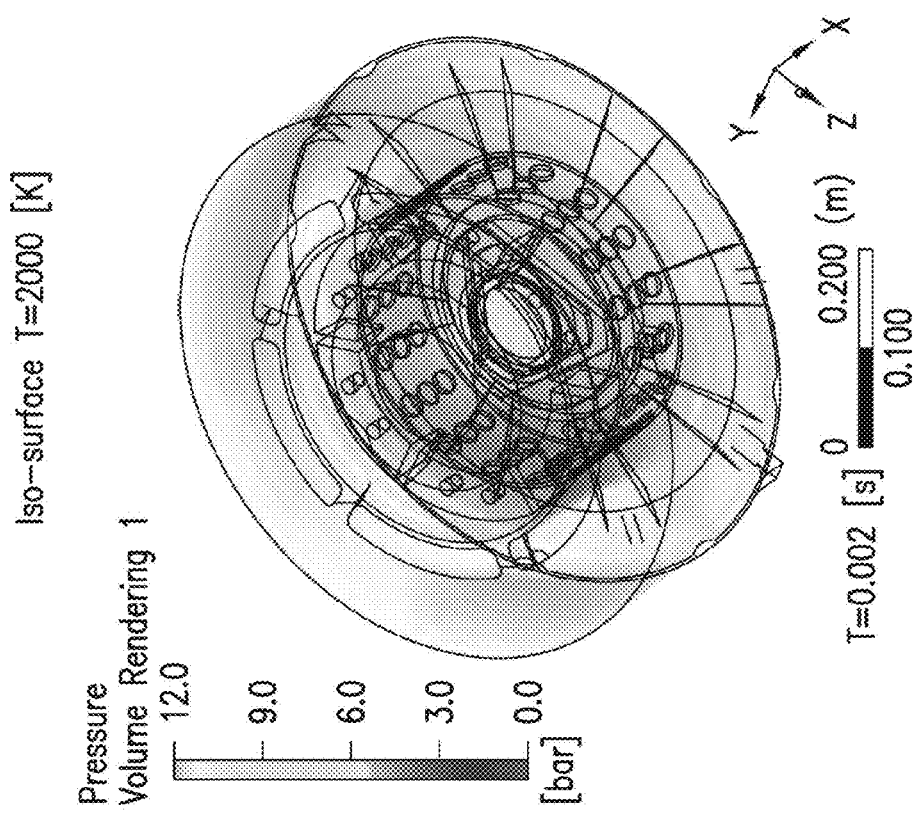
Figure 4C:
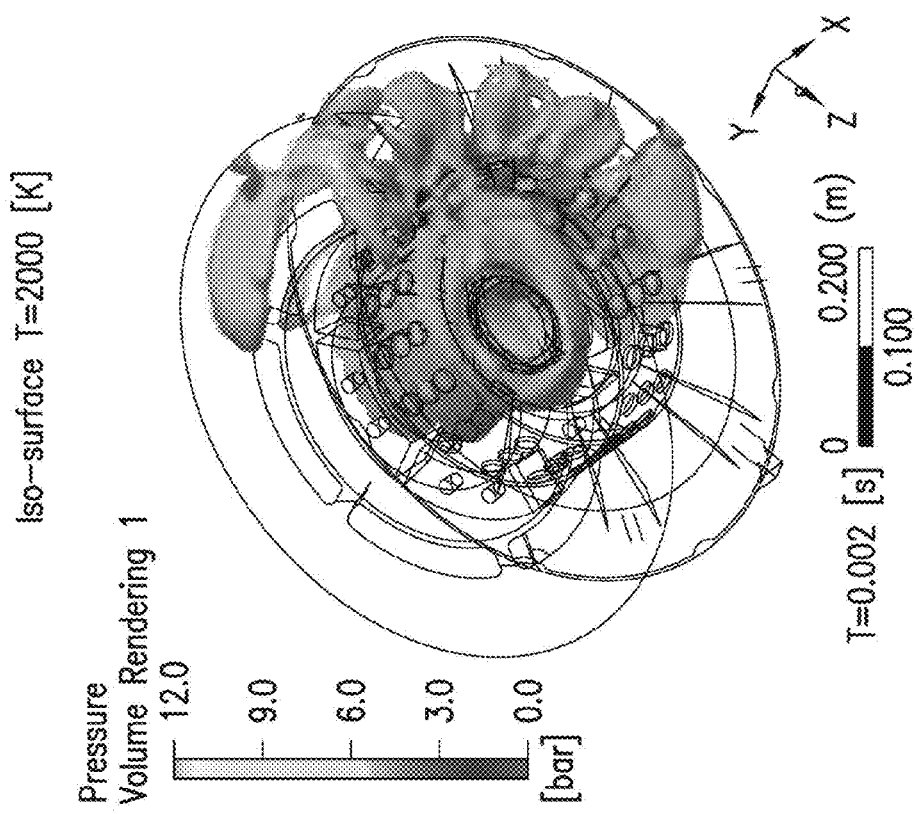
Figure 4F:
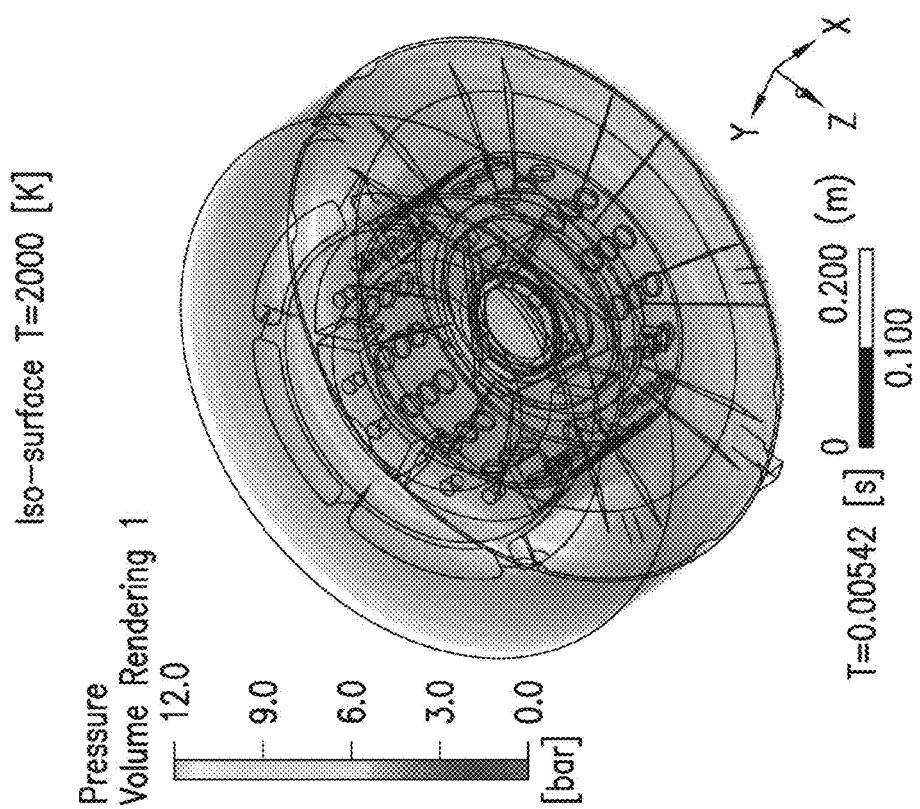
Figure 4E:
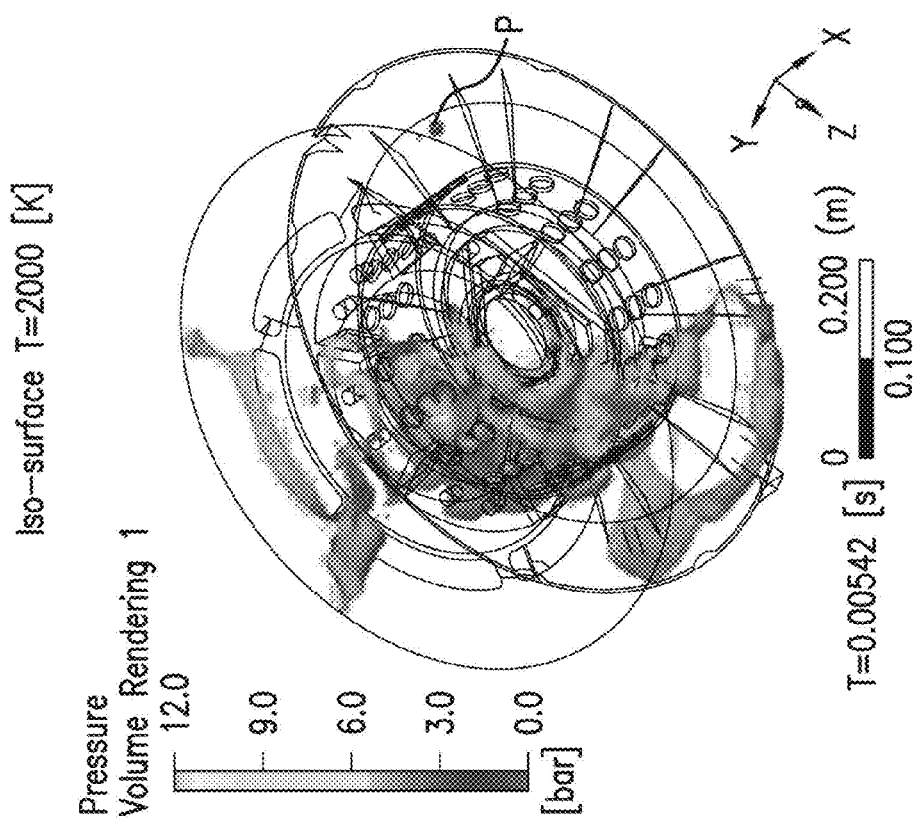
Figure 4G:
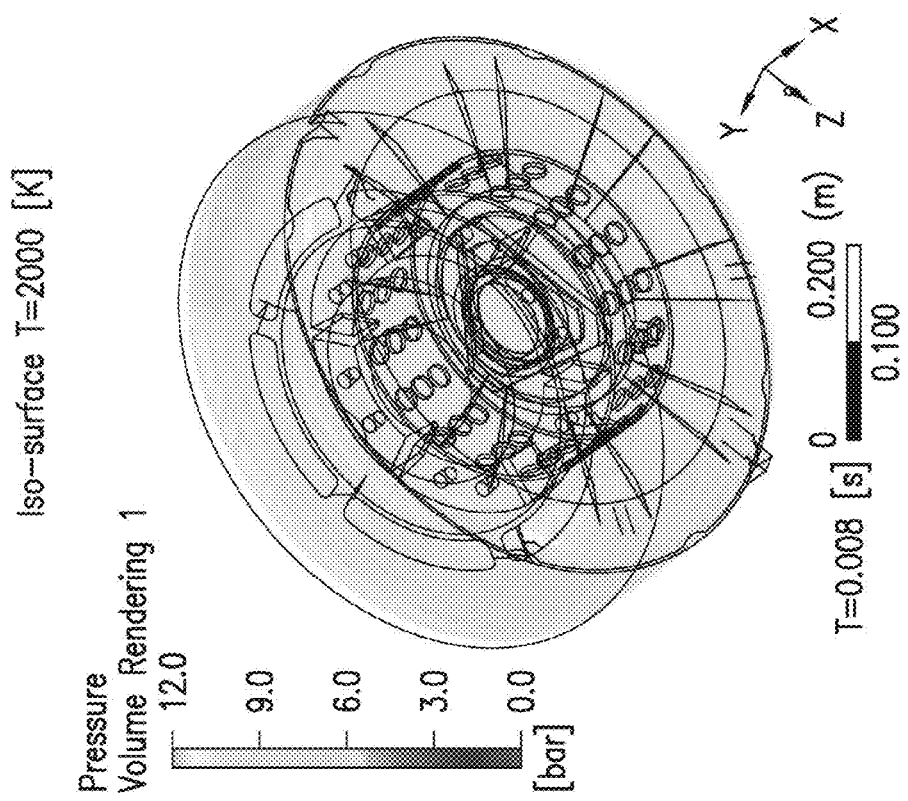
Figure 4H:
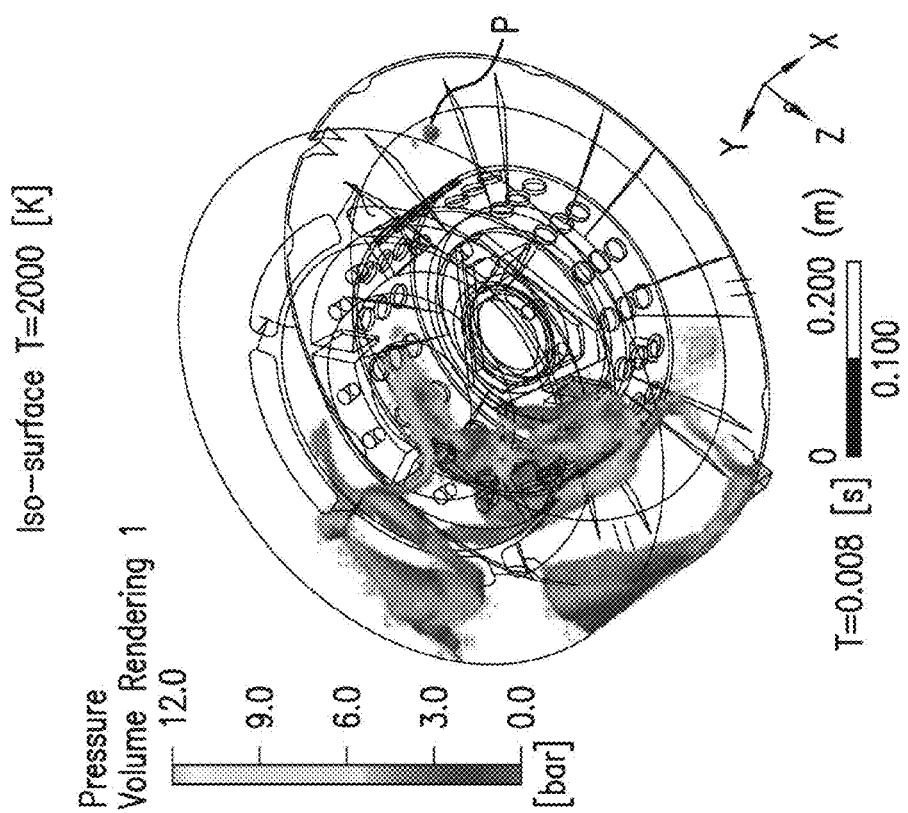
Figure 4J:
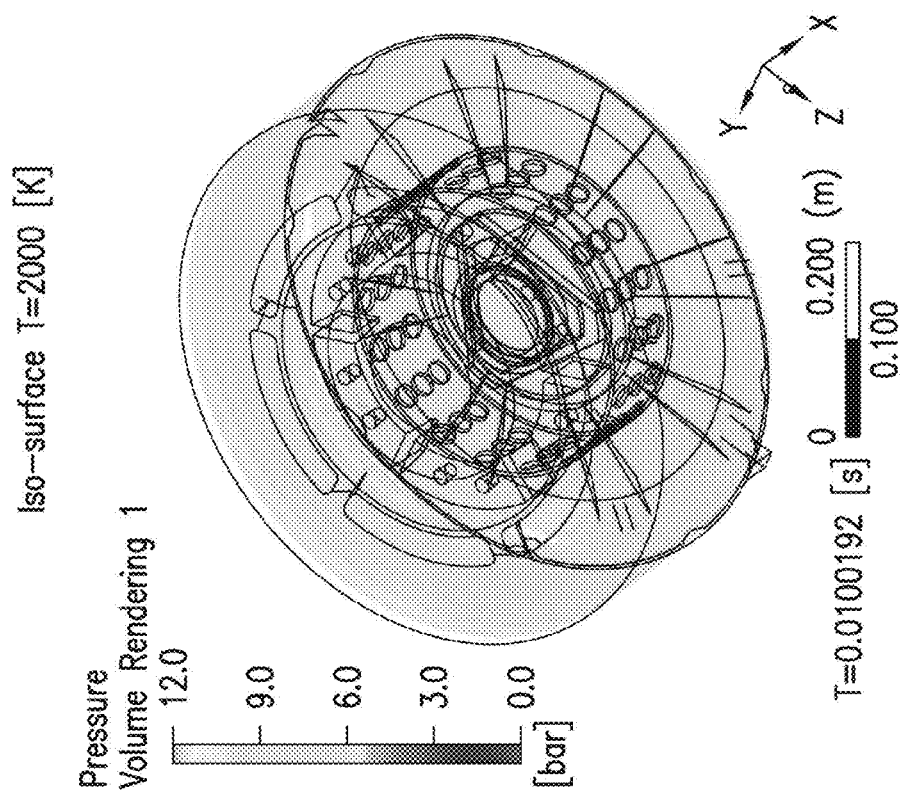
Figure 4I:
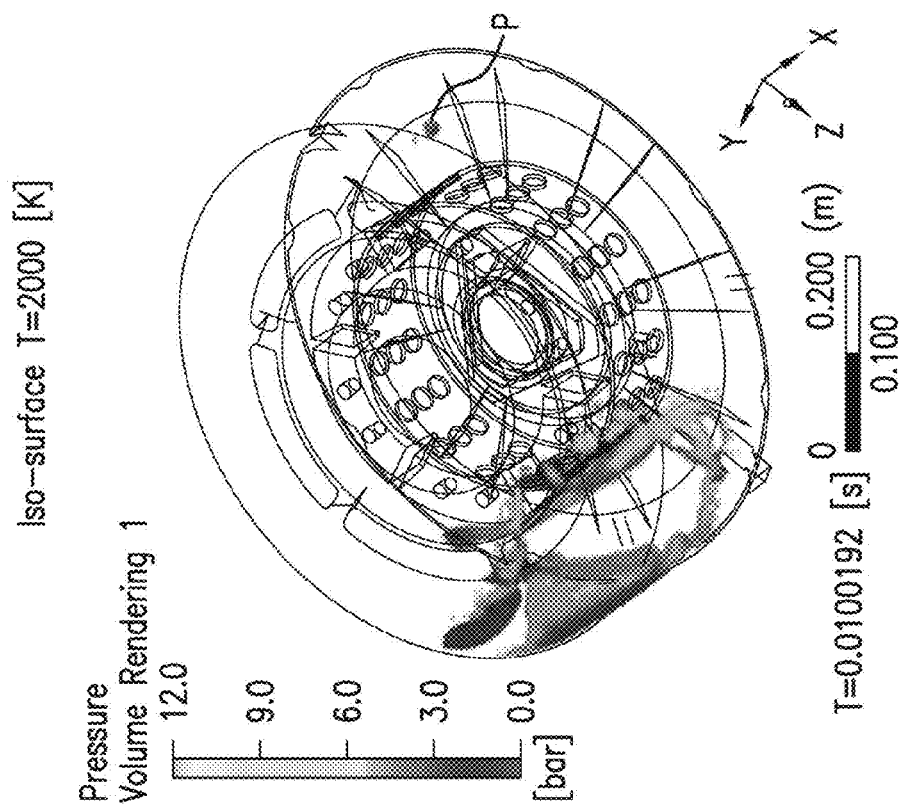

In certain embodiments, the device 1 is positioned concentrically and co-radially to the center of the stator coils, and in the axial direction between the stator head and the casing cover. FIG. 3 is a sectioned view of an exemplary embodiment of a rotating electrical machine having a pressure attenuator device.

However, it should be noted that this position may vary depending on the internal ventilation circuit of the rotating electrical machine. For example, the device 1 may be positioned to be under or over the coil head in the radial direction.

The pressure attenuator device in certain embodiments of the present invention can be attached anywhere in the cavity of the rotating electrical machine, including for example being attached to the cover, casing, coil or even to the machine axle.

In the first embodiment shown in the figures, the diameter of the ring 2 of the device 1 is associated with the size of the rotating electrical machine, and can range from about 50 mm to 1000 mm.

The geometry of the openings 3 of the circular ring can also assume different shapes, while still maintaining the system efficiency. Similarly, the number and size of openings 3 can be varied depending on the dimensions of the circular ring 2.

Accordingly, it should be noted that the term "openings" encompasses any material discontinuity, such as slots, holes, orifices, or hollow spaces in the device, having any geometry or dimensions, provided that they allow the segregation of the flame front.

FIGS. 4A to 4L are graphical representations showing, over time, the flame front and the pressure inside the cavity of a rotating electrical machine having the pressure attenuator 1 according to an exemplary embodiment of the present invention. Similar to that illustrated in FIGS. 1A to 1H, the point P corresponds to the ignition point. FIGS. 4A, 4C, 4E, 4G, 4I and 4K show the flame front at a temperature of 2000 K. FIGS. 4B, 4D, 4F, 4H, 4J, and 4L show the pressure, in bars, within the cavity.

As can be seen in FIGS. 4A to 4L, the device 4 segregates the flame front, thus avoiding it compresses and directs the gases that have not yet passed through the combustion process. Thus, with the use of the device 1 of the present invention, an expressive reduction of pressure inside the cavity of the rotating electrical machine is obtained.

Figure 5:
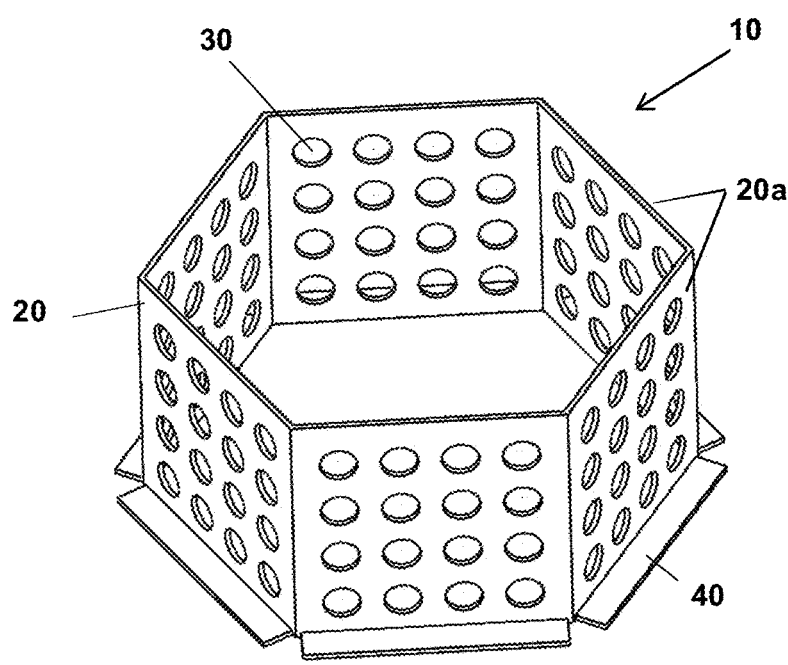
FIG. 5 is a perspective view of the pressure attenuator device, according to an exemplary embodiment, as described herein.

FIG. 5 shows an embodiment of the invention, where the screen 10 is formed by a polyhedron-shaped structure 20 defined by a finite plurality of wall sides 20a. The plurality of openings is disposed on the plurality of wall sides 20a.

Although FIG. 5 illustrates an embodiment of a polyhedral structure with 6 wall sides, it should be understood that the number of polyhedral wall sides could be larger or smaller without departing from the inventive concept of the invention disclosed herein. In certain embodiments, the finite number of sides of the polyhedron shaped structure is between 3 and 30 sides.

The screen 10 may further comprise edges 40 substantially perpendicular to the side walls 20a. These edges 40 can be used for attaching the screen 10 to the machine, for example, by means of screws.

Figure 6:
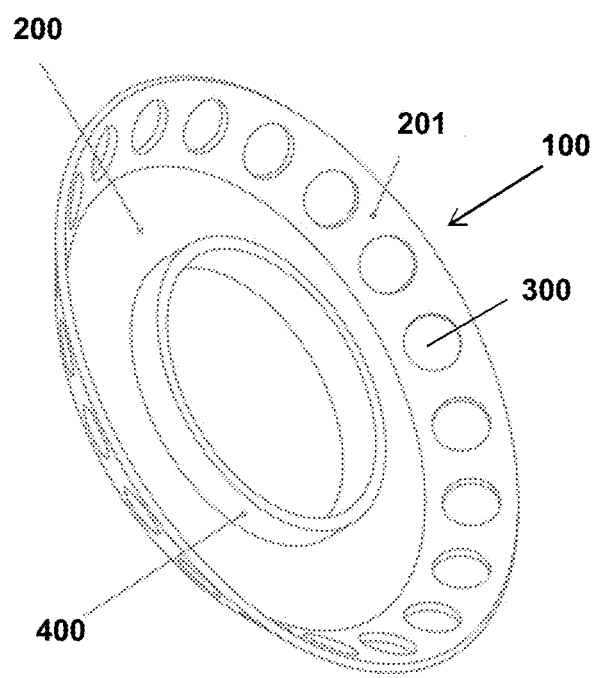
FIG. 6 is a perspective view of the pressure attenuator device, according to an exemplary embodiment, as described herein.
Figure 7:
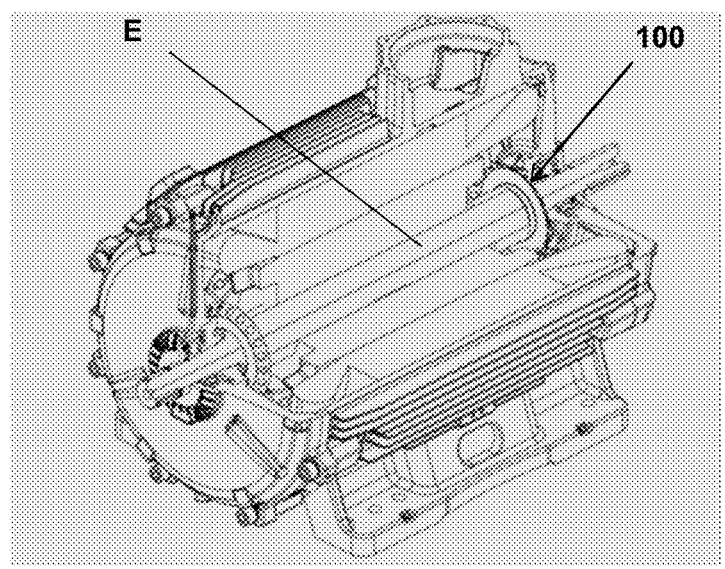
FIG. 7 is a sectioned view of a rotating electrical machine having a pressure attenuator device, according to an exemplary embodiment, as described herein.

FIGS. 6 and 7 show another exemplary embodiment of the pressure attenuator device. FIG. 6 is a perspective view of the pressure attenuator device, according to an exemplary embodiment as described herein. The screen includes a disk 100 defined by a flat wall 200 and an inclined wall 201, the inclined wall 201 having a plurality of openings 300.

The device 100 may further comprise an edge 400 that aids its attachment to the machine.

In certain embodiments, the disk 200 is fixed to the end cover of the rotating electric machine. As known to those skilled in the art, the cover is the end portion of the machine casing, i.e., the element responsible for closing the casing in the axial direction.

The attachment of the disk to the cover is performed by means of bolts and spacer sleeves.

In certain embodiments, the device 100 is positioned concentrically and coradial to the center of the stator coils, and in the axial direction between the head coil and the casing cover.

In another embodiment, the disk 100 is mounted on the axle E of motor. The attachment of the disk to the axle E may be performed by interference or by means of a fastening element. FIG. 7 illustrates this arrangement. In this embodiment, the pressure attenuator 100 is installed on the axle E next to the bearing, in order to prevent the spread of flame to the outside of the casing, through the interstitial generated between the axle and the casing.

The pressure attenuator device can be made of any suitable material such as steel, cast iron or thermoset.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. A pressure attenuator device for a rotating electrical machine having a casing that defines an internal cavity with a rotor-stator assembly, the device comprising
   a wall with a plurality of openings,
      wherein the wall is positioned within the internal cavity, and
      wherein the openings are configured to segregate a flame front propagating from an explosion process in the internal cavity.

2. The pressure attenuator device according to claim 1, wherein the wall is a cylindrical wall containing the plurality of openings.

3. The pressure attenuator device according to claim 1, wherein the screen comprises a polyhedron-shaped structure defined by a plurality of wall sides containing the plurality of openings.

4. The pressure attenuator device according to claim 1, wherein the screen comprises a disk defined by a flat wall and an inclined wall projecting from the flat wall and containing the plurality of openings.

5. The pressure attenuator device according to claim 1, wherein the rotor-stator assembly includes stator coils, and the wall is positioned concentrically and co-radially to center of the stator coils of the rotor-stator assembly.

6. The pressure attenuator device according to claim 1, wherein the rotor-stator assembly includes a stator coil head, and the wall is positioned under the stator coil head of the rotor-stator assembly in the radial direction.

7. The pressure attenuator device according to claim 1, wherein the rotor-stator assembly includes a stator coil head, and the wall is positioned over the stator coil head of the rotor-stator assembly in the radial direction.

8. A rotating electrical machine comprising:
a casing with a cover defining an internal cavity;
a rotor-stator assembly positioned inside the internal cavity; and
a pressure attenuator device positioned within the internal cavity, wherein the pressure attenuator device contains a wall with a plurality of openings, and
wherein the openings are configured to segregate a flame front propagating from an explosion process in the internal cavity.

9. The rotating electrical machine according to claim 8, wherein the wall is a cylindrical wall containing the plurality of openings.

10. The rotating electrical machine according to claim 8, wherein the screen comprises a polyhedron-shaped structure defined by a plurality of wall sides containing the plurality of openings.

11. The rotating electrical machine according to claim 8, wherein the screen comprises a disk defined by a flat wall and an inclined wall projecting from the flat wall and containing the plurality of openings.

12. The rotating electrical machine according to claim 8, wherein the rotor-stator assembly includes stator coils, and wherein the pressure attenuator device is positioned concentrically and co-radially to center of the stator coils of the rotor-stator assembly.

13. The rotating electrical machine according to claim 8, wherein the rotor-stator assembly includes a stator coil head, and wherein the pressure attenuator device is positioned under the stator coil head of the rotor-stator assembly in the radial direction.

14. The rotating electrical machine according to claim 8, wherein the rotor-stator assembly includes a stator coil head, and wherein the pressure attenuator device is positioned over the stator coil head of the rotor-stator assembly in the radial direction.

15. The rotating electrical machine according to claim 8, wherein the pressure attenuator device is attached to the cover of the rotating electrical machine.

16. The rotating electrical machine according to claim 8, wherein the pressure attenuator device is attached to the cover of the rotating electrical machine by one or more bolts and spacer sleeves.

17. The rotating electrical machine according to claim 8, wherein the pressure attenuator device is attached to a coil of the rotor-stator assembly of the electrical machine.

18. The rotating electrical machine according to claim 8, wherein the pressure attenuator device is attached to an axle of the rotating electrical machine.

\* \* \* \* \*